United States Patent [19]

George

[11] 3,906,083

[45] Sept. 16, 1975

[54] PROCESS FOR THE CONVERSION OF ANHYDRITE INTO GYPSUM

[75] Inventor: James Stanley George, Brampton, England

[73] Assignee: BPB Industries, Ltd., England

[22] Filed: May 9, 1973

[21] Appl. No.: 358,789

[30] Foreign Application Priority Data

May 11, 1972 United Kingdom............... 22195/72

[52] U.S. Cl. ................. 423/555; 106/109; 423/170
[51] Int. Cl.² .......................................... C01F 11/46
[58] Field of Search .......... 423/554, 555, 155, 164, 423/170, 171, 172; 106/109

[56] References Cited
UNITED STATES PATENTS

| | | | |
|---|---|---|---|
| 1,566,186 | 12/1925 | Farnsworth.......................... | 423/555 |
| 2,410,390 | 10/1949 | Paley ................................. | 106/109 |

FOREIGN PATENTS OR APPLICATIONS

| | | | |
|---|---|---|---|
| 561,206 | 5/1944 | United Kingdom................. | 423/554 |
| 4,528,284 | 9/1970 | Japan................................. | 423/554 |
| 12,007 | 1/1970 | Japan................................. | 423/554 |

Primary Examiner—Oscar R. Vertiz
Assistant Examiner—Gary P. Straub
Attorney, Agent, or Firm—Kenneth E. Roberts, Esq.; Stanton T. Hadley, Esq.; Samuel Kurlandsky

[57] ABSTRACT

Gypsum and gypsum plaster products can be made from an anhydrite or mixed anhydrite and gypsum starting material, of natural origin or derived chemically as a byproduct, by mixing the powdered anhydrite with part or all (but not more) of the water necessary for complete hydration to gypsum, compressing the mixture into compacted blocks or other bodies, and allowing the anhydrite to hydrate. If insufficient water is included in the mixture, the compacted bodies can be treated with water, for example by immersion, until sufficient water has been taken up. Accelerator can be mixed with the anhydrite or with the water. The product is a dry gypsum material in block or extruded form which can be used as such as calcined to form a satisfactory plaster.

9 Claims, No Drawings

PROCESS FOR THE CONVERSION OF ANHYDRITE INTO GYPSUM

The present invention relates to a process for the conversion of anhydrite into gypsum.

The anhydrous form of calcium sulphate (anhydrite) is found commonly in mineral deposits. Less commonly found is hydrated calcium sulphate (gypsum). Gypsum is used for the manufacture of plaster, plasterboard and cement. The uses of anhydrite are more limited and considerable efforts have been expended by other workers to evolve an economic conversion of anhydrite to gypsum.

It is an object of this invention to provide an improved process for the conversion of anhydrite to gypsum with a view to its subsequent use as gypsum, for example, in the manufacture of plaster or plaster products.

This invention now provides a process for converting anhydrite into gypsum wherein powdered anhydrite with the addition of water up to the amount necessary for complete hydration is compressed into the form of compacted bodies such as blocks, briquettes or pellets and the bodies are allowed or caused to hydrate to convert the anhydrite to gypsum.

At least a portion but not necessarily all of the water required for hydration must be incorporated with the powdered anhydrite before formation of the compacted bodies. The bodies may be subsequently treated with water, for example by immersion, in particular where the particle size distribution and the compaction pressure have been controlled to produce a compacted body of controlled porosity such that it will absorb only that quantity of water necessary for substantial rehydration. As a result, on the completion of hydration, a substantially dry product is obtained. The substantially dry body may be further treated or utilised as if it were naturally obtained gypsum.

If desired, accelerators known to promote the hydration reaction may be added either to the ground powder prior to compaction, or in the water added to the powder prior to compaction, or in the water in which the compacted bodies are immersed.

The process is applicable not only to anhydrite obtained by mining or quarrying, using conventional or mechanical means, but also to synthetic anhydrites obtained by chemical processing, for example in the manufacture of phosphoric or hydrofluoric acids. The process of this invention may also be used for hydration of mixtures of anhydrite and gypsum. In some cases such mixtures are more readily obtainable than anhydrite alone. In the case of a mixture of this nature, less water is required for the hydration of each compacted body. This reduced quantity of water can be controlled by controlling the porosity of the bodies or the immersion time.

In the preferred practice of this invention, the raw anhydrite is crushed and ground as necessary to achieve a suitable size and size distribution of the resultant particles. Conventional crushing and grinding equipment may be used. Part or all of the water required for hydration is then added to the ground anhydrite, which is subsequently formed into pellets, briquettes, blocks or other desired shapes by conventional means prior to hydration. Furthermore, an inorganic or organic binder may be added to assist in formation of the compacted body. Bentonite or carboxymethylcellulose are suitable materials for this purpose.

The compacted bodies, (briquettes or other bodies), may be soaked in water for a period between 15 minutes and 24 hours. This period is dependent upon the degree of saturation required and the porosity of the body. If desired, the water may contain a suitable accelerator to promote the conversion of anhydrite to gypsum. Accelerators of this kind, e.g. acids and salts, are well known. The water may also contain a wetting agent to assist the rapid entry of water into the body. The rate of absorption of water may also be increased by vacuum de-aeration prior to immersion. Pressure may also be applied during immersion to increase the absorption rate. Prior to immersion the bodies may be allowed to stand for some time, for example up to 3 days to mature or harden.

After immersion of the bodies in water, the surplus water is drained from them and they are then allowed to stand until hydration of the anhydrite to gypsum is substantially complete. Because of the control of pore size obtained by this process, drainage of the water from the interior of the body does not occur. By control of the porosity of the bodies, and of total immersion time in the water, it is possible to achieve a hydrated gypsum product which contains little or no free moisture. The costs and handling difficulties associated with drying, which result from conventional hydration processes are, therefore, eliminated. Depending upon the materials employed the period of hydration of bodies made according to this invention may vary from 2 days to 200 days.

After completion of hydration, the bodies may be handled and treated by conventional equipment used for handling mined gypsum rock and may be used for all purposes for which gypsum is conventionally employed.

The following are typical examples of the performance of a process according to this invention.

EXAMPLE 1

Natural anhydrite was ground and mixed with sufficient water to provide for complete hydration. A catalyst (sulphuric acid) was added in an appropriate amount and the mixture was pressed into block form. After 28 days the gypsum content of the block has reached 82%.

EXAMPLE 2

Natural anhydrite ground so that 72% passed a 100 mesh BS sieve was mixed with 6% by weight of water containing sulphuric acid as an accelerator. The mixture was pressed in an hydraulic press at 100 psig. The resulting briquette was allowed to harden for 24 hours before immersing in water containing a small amount of sulphuric acid. After 18 hours the briquette was removed and excess liquid wiped from the surface. The briquette was then allowed to hydrate in a closed container. The hydration proceeded as follows:

| Time (days) | 0 | 3 | 7 | 14 | 28 |
|---|---|---|---|---|---|
| Weight % gypsum in briquette | 2.5 | 40.4 | 46.7 | 47.7 | 53.0 |

EXAMPLE 3

Ground anhydrite containing some gypsum was mixed with water (15% by weight) and extruded into a cylindrical bar using an auger extruder as commonly found in the brick industry. The bar was cut into pieces about 3 inches in diameter and 9 inches long. Difficulty was experienced in obtaining a well formed body.

When made with the addition of 5% bentonite to the anhydrite before addition of water, the body extruded more easily and was well formed. Hydration of this latter extruded body proceeded as follows:

| Time (days) | 0 | 3 | 19 |
|---|---|---|---|
| Weight % of gypsum in this extruded body | 11.0 | 44.1 | 56.0 |

EXAMPLE 4

Natural anhydrite containing some gypsum, ground so that 97% passed a 100 mesh B.S. sieve, was mixed with 15.8% by weight of water containing a little sulphuric acid as accelerator. The resulting mixture was formed into a block and allowed to hydrate in a closed container. The progress was as follows:

| Time (days) | 0 | 10 | 17 | 25 | 32 | 41 |
|---|---|---|---|---|---|---|
| Weight % gypsum in block | 30.5 | 59.5 | 66.0 | 70.5 | 72.0 | 72.0 |

The gypsum prepared as described can be used for the preparation of gypsum products by conventional methods. Thus, for example, if can be dehydrated by conventional calcination techniques to form gypsum plaster which can in turn be used as such or manufactured by known methods into cast products or plasterboard.

It has been found by experience that, in general, the appropriate amount of water for complete hydration is taken up or retained when the compacted bodies have a porosity in the range 10 to 43%. To achieve this porosity it is desirable that the powdered anhydrite starting material should be below 7 mesh British Standard (less than 2.40 mm. diameter). Particularly fast rates of hydration are obtained when the particles of starting material pass 350 B.S. mesh or less than 50 microns.

I claim:

1. A process for preparing gypsum from anhydrite with an hydration period of 2 to 200 days comprising the steps of:
   1. mixing powdered anhydrite starting material which has an hydration period of at least 2 to 200 days and which passes a 7 mesh screen with about the amount of water necessary for complete hydration of the anhydrite to gypsum;
   2. compressing the resultant mixture of anhydrite and water into compacted bodies having a porosity of from 10 to 43%; and
   3. allowing the anhydrite in said bodies to hydrate at temperatures to produce a substantially dry body of gypsum.

2. The process according to claim 1, including the steps of withholding a portion of the water for complete hydration prior to compressing the mixture of anhydrite and water and after compression, adding the withheld water to the compacted bodies.

3. A process according to claim 2, wherein the withheld water is added by immersing the compacted bodies in water for from 15 minutes to 24 hours.

4. A process according to claim 2 wherein the compacted bodies are allowed to stand for up to 3 days before treatment with the withheld water.

5. A process according to claim 1, wherein a hydration accelerator is mixed with the powdered anhydrite.

6. A process according to claim 1, wherein a hydration accelerator is mixed with the water.

7. The process according to claim 2, wherein a hydration accelerator is mixed with the withheld water.

8. A process according to claim 1, wherein the anhydrite starting material contains gypsum in admixture.

9. A process for the manufacture of a gypsum plaster from anhydrite with an hydration period of 2 to 200 days comprising the steps of:
   1. mixing powdered anhydrite starting material which has an hydration period of at least 2 to 200 days and which passes a 7 mesh screen with about the amount of water necessary for complete hydration of the anhydrite to gypsum;
   2. compressing the resultant mixture of anhydrite and water into compacted bodies having a porosity of from 10 to 43%;
   3. allowing the anhydrite in said bodies to hydrate at temperatures to produce a substantially dry body of gypsum; and
   4. dehydrating the gypsum in a conventional manner to gypsum plaster.

* * * * *